May 12, 1953 F. J. VARGO 2,638,123
FOUR-WAY CHANGE-OVER VALVE
Filed Oct. 30, 1947 3 Sheets-Sheet 2
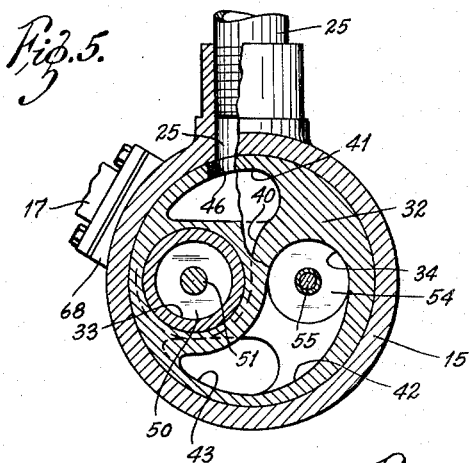
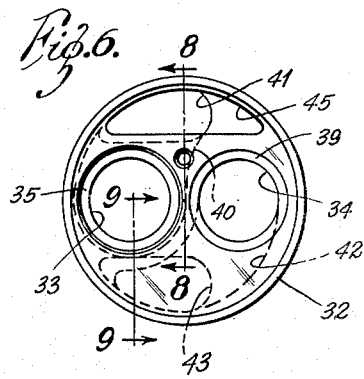
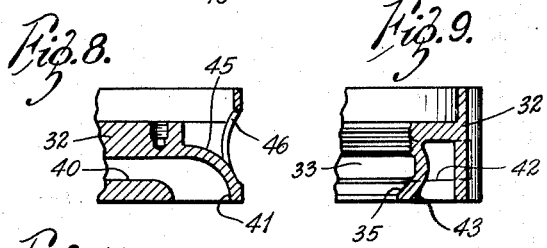
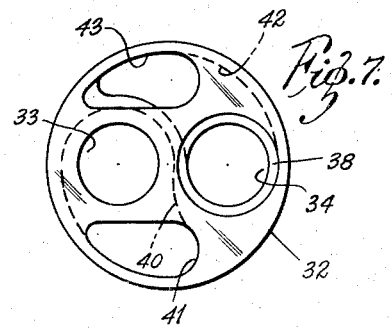
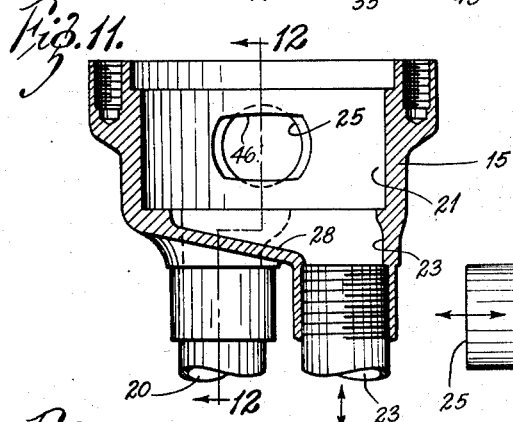
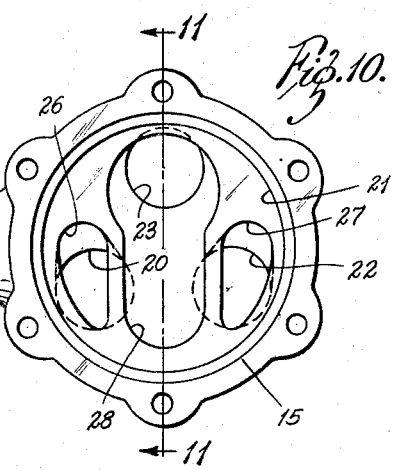
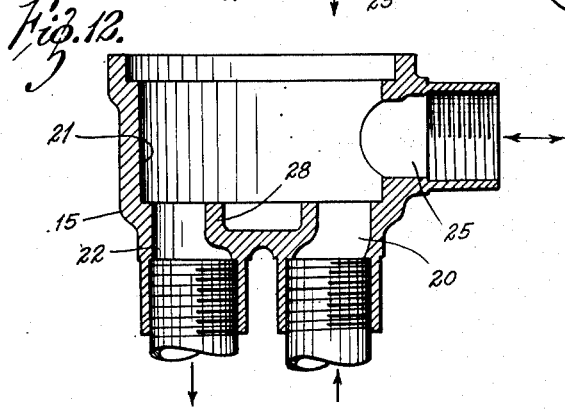
INVENTOR:
FRANK J. VARGO,
BY Rogers & Ezell
ATTORNEYS.

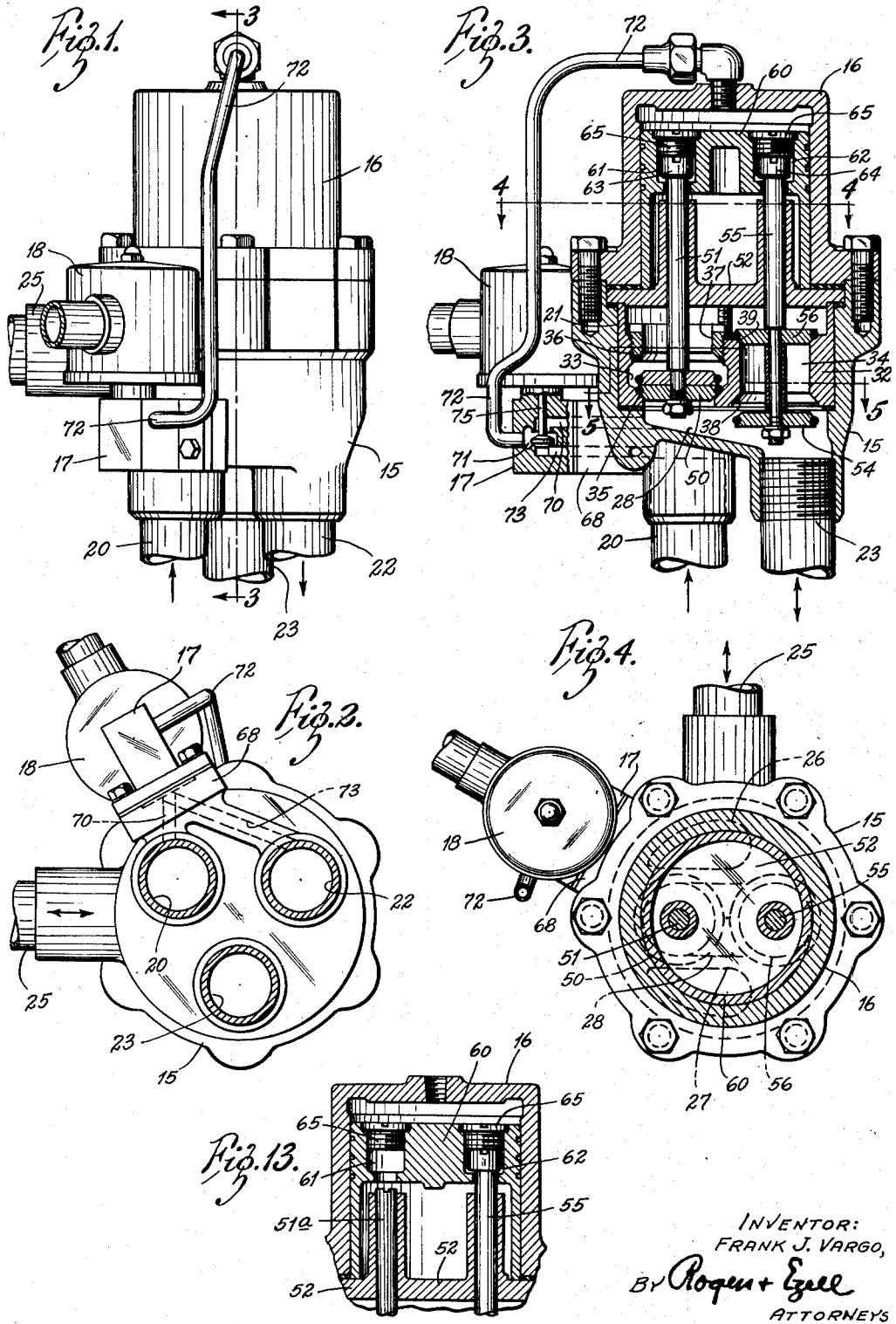

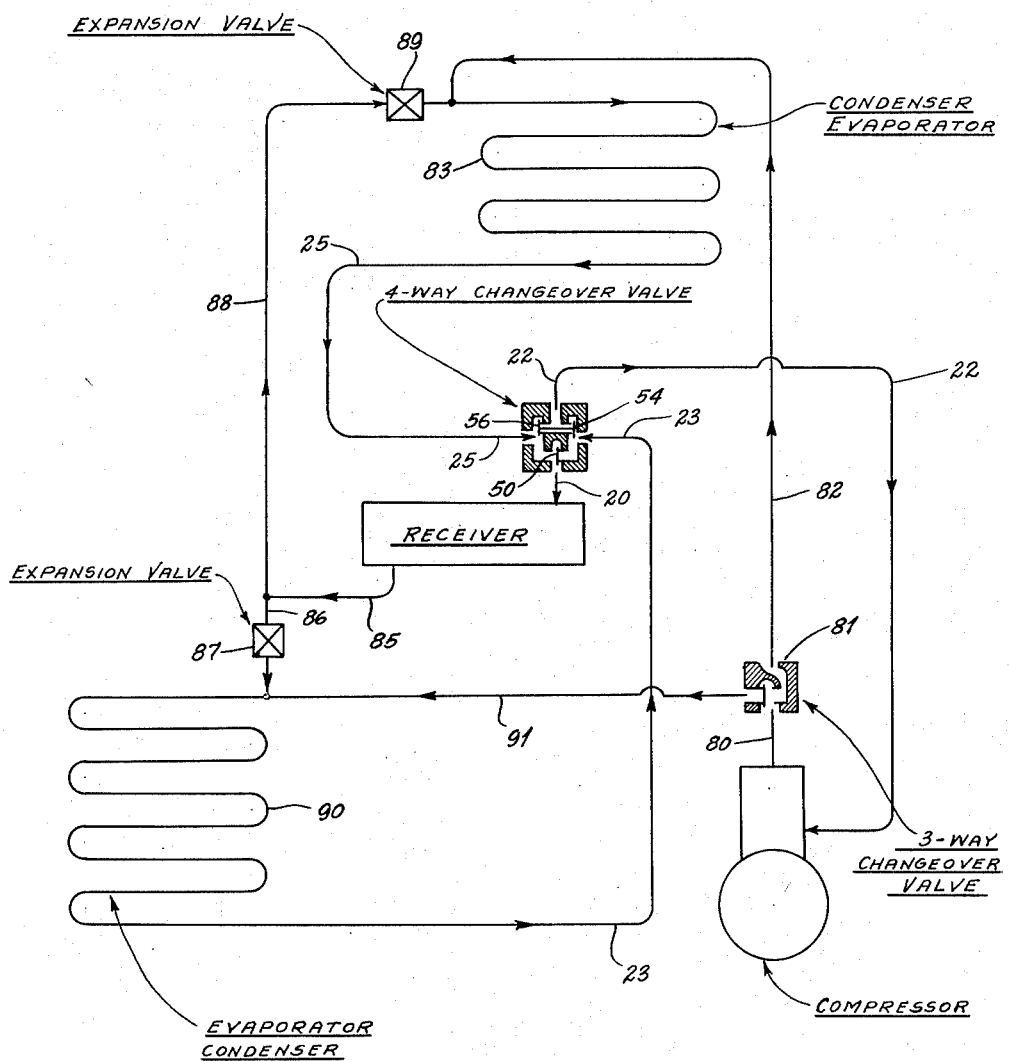

Patented May 12, 1953

2,638,123

UNITED STATES PATENT OFFICE 2,638,123

FOUR-WAY CHANGE-OVER VALVE

Frank J. Vargo, St. Louis County, Mo., assignor to Alco Valve Company, University City, Mo., a corporation of Missouri Application October 30, 1947, Serial No. 783,121

11 Claims. (Cl. 137—625)

The present invention relates to a four-way change-over valve. In particular, it relates to a valve that has a main inlet and a main outlet; and that also has two working ports; and that has valve combinations that are operable to connect one of the working ports with the main inlet and the other with the main outlet, and vice versa.

It is an object of the invention to provide a valve of the foregoing kind that is power operated; that has the valves seating always in the direction of flow; that is independent of minor maladjustments in relative positions of the valve elements of the valve mechanism; that is compact; that is easily serviced; and that is readily assembled and disassembled.

Other objects will appear from the description to follow.

In the drawings:

Fig. 1 is a side elevation of the valve mechanism;

Fig. 2 is a bottom view of the valve as shown in Fig. 1;

Fig. 3 is a vertical section, taken on the line 3—3 of Fig. 1, and hence at right angles to Fig. 1;

Fig. 4 is a horizontal section through the upper part of Fig. 3, taken on the line 4—4 thereof;

Fig. 5 is a horizontal section taken substantially on the line 5—5, below the middle of Fig. 3;

Fig. 6 is a plan view of a valve seat insert;

Fig. 7 is a bottom view of the valve seat insert;

Fig. 8 is a transverse fragmentary section of the valve seat insert, taken on the line 8—8 of Fig. 6;

Fig. 9 is a fragmentary section of the valve seat insert, taken on the line 9—9 of Fig. 6;

Fig. 10 is a plan view of the lower valve housing member;

Fig. 11 is a transverse section on the line 11—11 of Fig. 10 through the lower valve housing member;

Fig. 12 is a transverse section on the line 12—12 of Fig. 11 of the valve housing member;

Fig. 13 is a fragmentary view similar to Fig. 3, showing a modified valve stem construction; and Fig. 14 is a diagrammatic view of one system using the modified valve of the present application.

The main elements of this valve mechanism include a lower valve housing member 15, an upper valve cap member 16 that also contains the power operating means, a pilot valve housing 17 attached to the lower valve housing member 15, and a pilot valve actuating means 18 that may be a solenoid or the like.

The lower valve housing member 15 has a high pressure inlet 20 extending upwardly from the bottom thereof into a generally cylindrical chamber 21 in the lower housing 15. There is also a low pressure or return outlet 22 leading from the bottom of the valve housing member 15, and more particularly from the chamber 21. A working port 23 similarly leads from the bottom of the lower valve casing. Another working port 25 leads from the side of the lower valve casing 15.

A reference to Fig. 10 will show that the lower valve housing 15 has its bottom wall shaped so that the inlet 20 extends upwardly at one side of the bottom wall thereof and opens through in a somewhat raindrop-shape opening 26. In similar manner, the outlet 22 has its extension opening at 27 at the opposite side of the bottom wall of the housing member 15. The work line 23 opens upwardly and then has a channeled section 28 that extends across the middle part of the bottom wall of the casing 15, between the two extensions 26 and 27 and separated therefrom.

A valve seat insert 32 is adapted to be fitted into the cylindrical opening in the lower housing member 15, and provides a partition between the top and bottom of the lower housing member. The valve insert 32 is cylindrical and, as shown particularly in Figs. 3, 6 and 7, has two valve chambers 33 and 34 extending through it from top to bottom. The valve chamber 33 has a lower internal valve seat 35, and a coaxial opposite, upper internal valve seat 36, the latter being formed on a valve seat insert 37 that is removable in the manner indicated in the drawings. The other valve chamber 34 has a lower external valve seat 38 and a coaxial, opposite, upper external valve seat 39.

As indicated in the drawings, the valve chamber 33 has a somewhat spiral passageway 40 that extends laterally from between the two valve seats 35 and 36, to connect it with a recess 41 that is shaped correspondingly to the recess 26 in the lower valve casing member, in order that it can fit over the opening 26 and register therewith. In similar fashion, the valve chamber 34 between its two valve seats 38 and 39 has a passage 42 that extends to a recess 43 that is shaped correspondingly with the opening 27 of the main outlet in the lower valve casing member 15 so that it can register therewith.

In addition to the foregoing, the insert 32 at its edge on one side of its upper portion has a cutout or depression 45 that extends downwardly and communicates with an opening 46. This opening 46 registers with the working port 25 in the lower casing member 15.

The valve chamber 33 receives a double-acting valve element 50 that is supported upon a valve stem 51. The valve stem 51 extends upwardly through a guide boss in a plate 52. The stem 51 and its guide boss are so shaped as to permit restricted leakage between them.

The valve chamber 34 is also valve controlled. There is a lower valve member 54 mounted on a stem 55 for co-operation with the valve seat 36. Above the valve seat 36, there is a valve element 56 likewise mounted on the valve stem 55. The valve stem 55 loosely passes up through a boss in the plate 52 to permit restricted leakage.

The upper housing cover 16 has a cylindrical interior in which a piston 60 is mounted for vertical movement under pressure differentials. The piston 60 has two cavities 61 and 62 in its upper surface, and bottom openings through these cavities to below the piston. The valve stems 51 and 55 extend upwardly into the cavities 61 and 62, respectively. The valve stem 51 has a nut 63 within the cavity 61, and the valve stem 55 has a similar nut 64 within the cavity 62. It will be seen that these nuts afford some lost motion between the operation of the piston 60 and the operation of the valves. The upper ends of the cavities 61 and 62 are closed by threaded caps 65.

The piston 60 is adapted to be operated by a pilot valve arrangement, that may or may not be separate from the main casing. It is here shown as combined with the main casing. The lower casing member 15 has a boss 68 on one side to which is attached the pilot valve housing 17. This housing and its ports are diagrammatically illustrated in Fig. 3, it being evident that certain parts are disaligned for purposes of clarity in Fig. 3.

This housing 17 has a high pressure port 70 that connects through the wall of the lower housing member 15 into the high pressure inlet 20. This port 70 leads through a normally open valve seat into a valve chamber 71, from which a pilot tube 72 is connected, this tube extending around to the interior of the top of the casing 16 above the piston 60.

From the valve chamber 71 through a valve seat, there also leads an exhaust passage 73 that connects into the low pressure outlet 22. The communication from the valve chamber 71 to the suction line 73 is controlled by a valve 75 that is operated manually or automatically by some means such as the solenoid 18. It may be seen that normally high pressure runs directly through the passage 70 through a normally open valve seat into the chamber 71, then through the tube 72 into the top of the cylinder where it tends to force the piston 60 down. When the valve 75 is operated, the normally open valve seat is closed and the normally closed valve seat is opened, allowing this high pressure to bleed out into the low pressure outlet and the pressure in the top of the cylinder is released.

In Fig. 13, a modification is shown wherein the valve stem 51a is not attached to the piston 60, but rather is independently movable by pressure conditions, as will be described. The other valve stem 55 remains as before.

The valve of Fig. 13 is particularly desirable in a variant of the previously mentioned conventional reverse-cycle system. Such variant is diagrammatically shown in Fig. 14.

In Fig. 14, the compressor discharges by a high pressure line 80 into a three-way valve 81. This valve is manually shiftable to connect the line 80 with either of two outlets. The first outlet connects by a line 82 to the inlet of a first condenser evaporator coil 83. The outlet of the coil 83 connects with the inlet 25 to the four-way valve of Fig. 3 as modified in Fig. 13. The compressor return, or suction line outlet 22 of the valve leads back to the compressor. The outlet 29 of the valve is connected to a receiver, that in turn is connected by a pipe 85 to a branched line, one end 86 of which leads to an expansion valve 87, and the other end 88 of which leads to an expansion valve 89, the latter being selectively operable for connection of the line 88 into the coil 83. The expansion valve 87 is likewise operable to open into an evaporator condenser coil 90, the outlet end of which is connected to the port 23 of the four-way valve. The other outlet of the three-way valve 81 connects by a line 91 to the inlet of the coil 90.

Operation

A particular use of this valve construction is in connection with reverse cycle refrigeration systems. A conventional system illustrating the use of the main valve construction is not shown in the drawings and reference is made to application Serial No. 720,956, filed January 9, 1947, and assigned to the assignee hereof, for further description of such a system. In reverse cycle systems, there is conventionally a compressor, a condenser coil, an expansion valve, and an evaporator coil, all connected in a series circuit. One coil is located inside a space to be tempered and the other is outside. When it is desired to cool the space, the inside coil will act as the evaporator, the outside coil being the condenser. When, however, it is desired to heat the space, the refrigeration cycle is reversed in direction, so that the outside coil acts as the evaporator and the inside coil acts as a condenser. It will thus be seen that, while the outflow and inflow of the compressor are not changed, the direction of flow through the work lines is reversed when it is desired to reverse the cycle. The present valve accomplishes this purpose. Of course, the valve is capable of other uses.

It will be assumed that the solenoid 18 is connected to be operated by some suitable control, manual or automatic, so that, when this control operates to energize the solenoid in response to one set of conditions, the valve stem 75 will open the normally closed valve seat and close the normally open valve seat, and, when the solenoid is deenergized responding to another set of conditions, the valve stem 75 will close the normally closed valve seat and open the normally open valve seat. Thus, the solenoid 18 controls the direction of the flow through the valve and through the refrigeration system. The main valve is shown in the deenergized position in Fig. 3. Other controls for the valve 75 may be employed to obtain the same cycle.

With the arrangements as indicated in Fig. 3 and with a conventional refrigeration system, the compressor will deliver high pressure refrigerant gas to the high pressure inlet 20 in the bottom of the lower housing 15. This gas will then pass into the opening 41 and be delivered to the valve chamber 33 between the two internal valve seats 35 and 36. At the same time, this compressor pressure is delivered through the pilot line 70, where, with the pilot valve deenergized, it then passes through the normally open valve seat and through the pilot tube 72 and is delivered to the cylinder above the piston 60, causing that piston to occupy its lower position. This inlet pressure gas likewise may leak upwardly past the partition 52, along the valve stems 51 and 55 to below the piston. These pressures are ultimately equalized and the valves are caused to remain in their lower position by forces to appear.

From the valve chamber 33, the refrigerant gas flows past the open valve seat 36 to the space above the insert 32. Thence it may flow through the recess 45 and out the port 46 in the insert, and ultimately into the working line 25. From this working line, it passes through the system where it loses pressure. In a refrigeration system, it flows through the condenser coil where it is condensed and gives up heat. Thence it flows through the expansion valve and into the evaporator coil where it absorbs heat. From the evaporator coil, it returns into the other working line inlet 23 into the lower casing 15 at reduced pressure. From this inlet 23, it enters the middle recess 28, and, owing to the fact that the valve 54 is open, it may then enter the valve chamber 34 of the external valve. Owing to the fact that the valve 56 is closed, this gas then returns by way of the opening 42 to the suction port 22, and thence returns to the compressor. Consequently, with the valves in the positions indicated, the flow is in one direction, that is to say, it flows out the work line 25 and returns in the work line 23.

If the solenoid 18 is actuated so as to shift the valve stem 75 upward, the flow through the work lines is reversed, as will now be described. When the valve stem 75 moves upwardly, the high pressure gas from above the piston 60 is released through the normally closed valve seat, then through the suction passage 73 to the suction line 22. When this occurs, the high pressure that had existed under the piston causes the piston to rise owing to the fact that the escape of this high pressure is restricted. As the piston rises, it causes the two valve sets to rise, at least past the dead-center position, so that the valve 50 is disposed close to the valve seat 36 and away from the valve seat 35. Similarly, the valve 56 is moved away from the valve seat 39, and the valve 54 is brought close to the valve seat 38.

When the valve 50 leaves the seat 35 and approaches the seat 36, the high pressure fluid from the compressor may begin to discharge through the inlet 20 and into the space 28 leading to the working outlet 23 and also may, if the valve 54 is not fully closed, escape into the low pressure valve chamber 34, and to the outlet 22. Additionally, if the valve 50 is not moved to close with the valve seat 36, the high pressure flow may escape around the valve into the space above the insert 32, whence it is short circuited directly to the outlet chamber 34 as the valve 56 is wide open.

The two valve means 50 and 54, 56 are displaced by the piston far enough that they will fully open their formerly closed seats, and will be close enough to the formerly open seats to produce pressure drops in the flow past them. Hence the inlet pressure flowing past the valve 50 and the seat 36 drops above the valve, producing an unbalanced effect with high inlet pressure on the lower side of the valve 50 and reduced pressure on its upper side. This pressure differential causes the valve 50 to complete its stroke and seat upon the seat 36, the lost motion connection permitting such movement. Thereupon inlet pressure cannot pass through this valve seat 36, but is delivered in full force to the lower space 28.

Similarly, the short circuiting of inlet pressure from the lower space 28 past the valve 54 causes a pressure differential that results in firm seating of that valve.

From the foregoing, it may be seen that, although the piston need not do more than bring the valves approximately to their respective seats, they will be caused to seat firmly because they move with pressure conditions.

After they have been moved into the upper portions, the high pressure gas then passes into the work port 23, and returns into the working port 25 at reduced pressure. In the reverse cycle system mentioned, this means that high pressure refrigerant gas is now delivered to what was formerly the evaporator coil but is changed to the condenser. It then flows to the expansion valve, thence to the former condenser coil which now is an evaporator, and finally back through the other working inlet 25 to the space above the valves above the partition 32, through the seat opening 39, into the valve chamber 34, and thence into the suction line 22.

In the foregoing, with suction pressure on both sides of the piston 60, the piston would tend to descend by gravity except for the fact that the pressure differentials acting on the valves hold it in its upper position. However, if the solenoid is deenergized, so that the valve stem 75 closes the normally closed valve seat and opens the normally open valve seat, then high pressure will again be delivered to the top of the piston and it will be forced down. In this downward action, the valves are firmly seated by the pressure conditions similarly to their being seated by the reverse pressure conditions.

By moving both valves, it is impossible to trap high pressure from the compressor valve to one or the other of the coils at the time of a shiftover. Yet, by having both valves seated by pressures, it is not necessary to have completely accurate interfitting of the parts, as would be true where both were actuated purely mechanically.

The operation of the modification of Fig. 13 is somewhat different, in that the valve 50 is not mechanically moved by the piston 60, but rather is pressure actuated as a result of movement of the piston. An installation wherein the construction of Fig. 13 is particularly desirable is shown in Fig. 14. Its operation is as follows:

The compressor discharges high pressure gas to the line 80, and the three-way valve 81. This valve is shown as open to the line 82 and closed to the line 91. Hence the gas flows via the line 82 to the inlet of the condenser-evaporator coil 83, the expansion valve 89 being closed. The gas passes into the coil 83 and is condensed, flowing therefrom into the inlet 25 of the four-way valve, this inlet being described earlier.

The piston 60 being down as in Fig. 3, the valves 50, 54 and 56 are down. The ports 25 and 20 are connected, and the refrigerant flows out the latter into the receiver. Thence it passes by the line 85 and the branch 86 to the expansion valve 87, whereat it expands and enters the evaporator-condenser coil 90. From the coil 90 it enters the port 23 of the four-way valve, passes the valve head 54, and enters the suction port 22 for return to the compressor.

To reverse the system, the three-way valve 81 is shifted to deliver high pressure gas to the line 91 and inlet 23, and the pilot valve operated to cause the piston 60 of the four-way valve to rise. The piston lifts the valves 54 and 56, opening the valve 56 and closing the valve 54. Secure seating of the valve 54 is obtained by the delivery of condenser pressure thereagainst through inlet 23, opposed only by compressor suction pressure from outlet 20.

At this point, the compressor is now delivering high pressure gas to the valve 81, the line 91, the coil 90 that now is a condenser (the expansion valve 87 is now closed and the expansion valve 89 open). From the coil 90, the liquid flows to the inlet 23, seating the valve 54 as aforesaid, and applying pressure tending to lift the valve 50.

From the previous cycle, the coil 83 may be charged with liquid, and this liquid should be prevented from entering the suction line to the compressor, which it might do, by passing the valve 56. However, with the valve 50 open at its upper seat (to the left in Fig. 14), this liquid can drain into the receiver. Owing to the fact that at the time of change-over, condenser-receiver pressure acts against the upper (leftward) side of the valve 50, in opposition to the newly generating condenser pressure oppositely acting on the valve 50. As a result, the valve 50 will not shift immediately upon movement of the piston and the external valves, but will delay until the opposing pressure lowers to a value below that from the coil 90. During this time, the liquid from the coil 83 will drain past the valve 50 and into the receiver. Flash gas will flow to the suction line 22, and may counterflow to the liquid in the well known manner from the receiver. This delayed action eliminates, or at least minimizes, the flow of liquid into the suction line.

When the piston is subsequently lowered, the valves will move oppositely to the above, and the other coil 90 will be permitted to drain into the receiver.

This structure, therefore, accomplishes its objectives and is highly compact, easy to service, and relatively inexpensive to build and assemble.

What is claimed is:

1. In a valve construction, a housing having a main high pressure inlet, a return low pressure outlet, and two working outlets, an inlet valve chamber and an outlet valve chamber in said housing, each chamber having a pair of opposite valve seats, the first working outlet communicating with the first valve seats of both chambers, the second working outlet communicating with the second valve seats of both chambers, inlet valve means for the inlet chamber and outlet valve means for the outlet chamber, each valve means being movable from its first valve seat to its second valve seat, means for moving said valve means so that when the inlet valve means is moved from its first valve seat toward its second valve seat the outlet valve means is moved from its second valve seat toward its first valve seat, and vice versa, said moving means being adapted to move said valve means from one set of their seats toward the other set, to dispose the valve means in positions to produce pressure drops across the valve seats toward which they are moved, that causes said valve means to close securely on said seats, said moving means comprising a pressure-movable member in a pressure chamber, a connecting passage means between the inlet and said pressure chamber, a connecting passage means between the pressure chamber and the return outlet, and pilot valve means controlling the connection of said pressure chamber and said connecting passage means, said pilot valve being adapted to open to release the pressure chamber to the suction outlet, and means to admit inlet pressure oppositely onto the pressure-movable member when inlet pressure is applied to the pressure chamber by closing of the pilot valve.

2. In a valve construction, a housing having an inlet, an outlet, and a pair of working ports, a partition means in the housing, one working port being connected to one side of the partition means, and the other working port to the opposite side, an inlet chamber in the partition means opening to opposite sides thereof, and connected to the inlet, an outlet chamber in the partition opening to opposite sides thereof and connected to the outlet, inlet valve means selectively to cut the inlet chamber off from either working port, and outlet valve means selectively to cut the outlet chamber off from either working port, the two valve means being movable in parallel paths, and having parallel valve stems, a piston chamber attached to the housing, and a piston movable in the piston chamber and connected to the valve stems, means restrictively connecting one side of the piston with one working port, and pilot valve controlled means for selectively connecting the other side of the piston with the inlet or the outlet.

3. In a valve, first and second valve chambers, each having a port connecting thereinto, opposite valve-seated openings from each of said first and second ports, first and second outlets, the first outlet being connected with the two chambers through one set of openings, the second outlet being connected with the two chambers through the other set of openings, a first valve operable for the first chamber, to close one opening therefrom and open the other, and vice versa, a second valve similarly operable for the second chamber, means to shift one of said valves from one opening of its chamber to the other, and means to guide the other valve in movement from one opening of its chamber to the other, said other valve moving independently of the shifting means.

4. In a valve, first and second valve chambers, each having a port connecting thereinto, opposite valve-seated openings from each of said first and second ports, first and second outlets, the first outlet being connected with the two chambers through one set of openings, the second outlet being connected with the two chambers through the other set of openings, a first valve operable for the first chamber, to close one opening therefrom and open the other, and vice versa, a second valve similarly operable for the second chamber, means to shift one of said valves from one opening of its chamber to the other, and means to guide the other valve in movement from one opening of its chamber to the other, said shifting means comprising a power movable element connected with one valve, the other valve being movable independently of said element.

5. In a valve construction, a housing containing first, second, third and fourth openings; a first valve chamber within the housing having spaced valve seat openings, the first opening being connected to the first chamber between the valve seats and one seat opening leading to each of said third and fourth openings; a second valve chamber within the housing having spaced valve seat openings, the second opening being connected to the second chamber between the valve seats and one seat leading to each of said third and fourth openings; individual valve means associated with each valve chamber and its valve seat openings to selectively close either valve seat opening thereof and open the other; and means for mechanically shifting only one of said valve means from one seat toward its other seat, there being limited relative movement connections between the valve means and the actuating means, and between the individual valve means whereby the other valve means is caused to move from one valve seat to its other valve seat because of the pressure conditions in the housing.

6. In a valve construction, a housing containing an inlet, an outlet, and two working ports; an inlet valve chamber within the housing having spaced valve seat openings, the inlet being connected to the inlet chamber between the valve seats and one seat opening leading to each working port; an outlet valve chamber within the housing having spaced valve seat openings, the outlet being connected to the outlet chamber between the valve seats and one seat leading to each working port; individual valve means associated with each valve chamber and its valve seat openings to selectively close either valve seat opening thereof and open the other; pressure-responsive means for actuating said valve means; means restrictively connecting one side of the pressure-responsive means with one working port; and means for selectively connecting the other side of the pressure-responsive means with either the inlet or the outlet.

7. In a valve construction, a housing containing an inlet, an outlet, and first and second work ports; valve means in the housing for controlling fluid flow therethrough; pressure-responsive means for actuating the valve means; a first chamber on one side of the pressure-responsive means and a second chamber on the opposite side thereof; means for selectively connecting the first chamber with the inlet or the outlet; the valve means connecting the inlet with the first work port and the outlet with the second work port when the inlet is connected with the first chamber, and connecting the inlet with the second work port and the outlet with the first work port when the first chamber is connected to the outlet; and means restrictively connecting the second chamber with the first work port.

8. In a valve construction, a housing containing an inlet, an outlet, and first and second work ports; valve means in the housing movable in one direction to connect the inlet with the first work port and the outlet with the second work port, and movable in the other direction to connect the inlet with the second work port and the outlet with the first work port; pressure-responsive means for actuating the valve means; a first chamber on one side of the pressure-responsive means to receive fluid to cause movement thereof to move the valve means in said one direction, and a second chamber on the opposite side thereof to receive fluid to cause movement of the pressure-responsive means in said other direction; means for selectively connecting the first chamber with either the inlet or the outlet; and means restrictively connecting the second chamber with the first work port.

9. In a valve construction, a housing containing an inlet, an outlet, and first and second work ports; valve means in the housing movable in one direction to connect the inlet with the first work port and the outlet with the second work port, and movable in the other direction to connect the inlet with the second work port and the outlet with the first work port; pressure-responsive means for actuating the valve means; a first chamber on one side of the pressure-responsive means to receive fluid to cause movement thereof to move the valve means in said one direction, and a second chamber on the opposite side thereof to receive fluid to cause movement of the pressure-responsive means in said other direction; means for selectively connecting the first chamber with either the inlet or the outlet; and means for restrictively connecting the second chamber with the inlet or with the outlet.

10. In a valve construction, a housing containing an inlet, an outlet, and first and second work ports; valve means in the housing movable in one direction to connect the inlet with the first work port and the outlet with the second work port, and movable in the other direction to connect the inlet with the second work port and the outlet with the first work port; pressure-responsive means for actuating the valve means; a first chamber on one side of the pressure-responsive means to receive fluid to cause movement thereof to move the valve means in said one direction, and a second chamber on the opposite side thereof to receive fluid to cause movement of the pressure-responsive means in said other direction; means for selectively connecting the first chamber with either the inlet or the outlet; and means restrictively connecting the second chamber with the inlet when the valve means are moved in said one direction and with the outlet when the valve means are moved in said other direction.

11. In a valve construction, a housing containing a first, second, third and fourth opening; a first valve chamber within the housing having spaced valve seat openings, the first opening being connected to the first chamber between the valve seats and one seat opening leading to each of said third and fourth openings; a second valve chamber, within the housing having spaced valve seat openings, the second opening being connected to the second chamber between the valve seats and one seat leading to each of said third and fourth openings; individual valve means associated with each valve chamber and its valve seat openings to close selectively either valve seat opening thereof and open the other; pressure-responsive means for at least one of said valve means; means restrictively connecting one side of the pressure-responsive means with one of said third and fourth openings; and means for selectively connecting the other side of the pressure-responsive means with either said first or second openings.

FRANK J. VARGO.

References Cited in the file of this patent

UNITED STATES PATENTS

| Number | Name | Date |
|---|---|---|
| 615,881 | McIntosh | Dec. 13, 1898 |
| 1,850,595 | McCune | Mar. 22, 1932 |
| 2,046,640 | Loftus | July 7, 1936 |
| 2,074,292 | Wilkins | Mar. 16, 1937 |
| 2,148,415 | Labberton | Feb. 21, 1939 |
| 2,218,861 | Stumpf | Oct. 22, 1940 |
| 2,263,476 | Sunday | Nov. 18, 1941 |